May 5, 1964     R. E. PHELON     3,132,270
ROTOR ANNULUS FOR ELECTRIC GENERATOR
Filed Sept. 29, 1959     4 Sheets-Sheet 1

INVENTOR
RUSSELL E. PHELON

BY Teller & McCormick

ATTORNEYS

May 5, 1964 R. E. PHELON 3,132,270
ROTOR ANNULUS FOR ELECTRIC GENERATOR
Filed Sept. 29, 1959 4 Sheets-Sheet 2
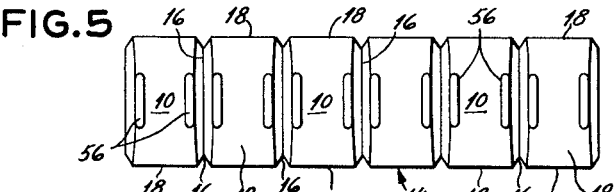
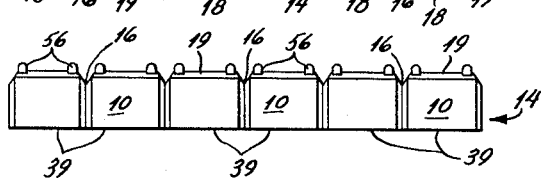
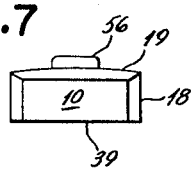
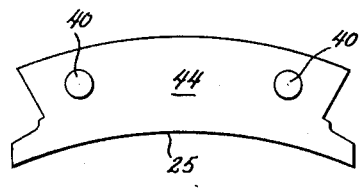
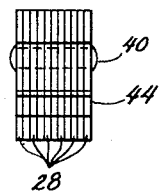
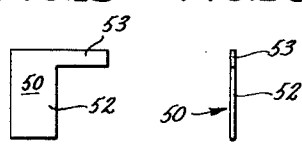
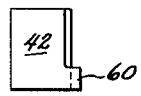
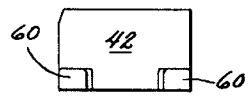
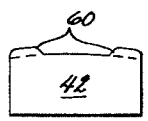
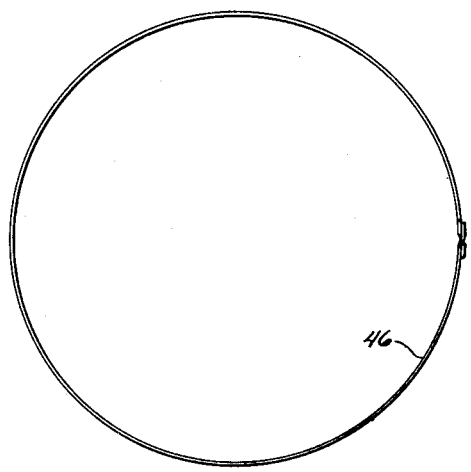
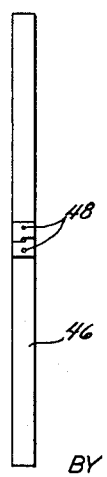
*INVENTOR*
*RUSSELL E. PHELON*
BY Teller & McCormick
ATTORNEYS May 5, 1964  R. E. PHELON  3,132,270
ROTOR ANNULUS FOR ELECTRIC GENERATOR
Filed Sept. 29, 1959  4 Sheets-Sheet 3

INVENTOR
RUSSELL E. PHELON

BY *Teller & McCormick*

ATTORNEYS

May 5, 1964   R. E. PHELON   3,132,270
ROTOR ANNULUS FOR ELECTRIC GENERATOR
Filed Sept. 29, 1959   4 Sheets-Sheet 4

INVENTOR
RUSSELL E. PHELON
BY Teller & McCormick
ATTORNEYS

United States Patent Office 3,132,270
Patented May 5, 1964

3,132,270
ROTOR ANNULUS FOR ELECTRIC GENERATOR
Russell E. Phelon, % R. E. Phelon Co. Inc.,
East Longmeadow, Mass.
Filed Sept. 29, 1959, Ser. No. 843,172
4 Claims. (Cl. 310—156)

The invention relates generally to electric generators adapted for use with internal combustion engines and more particularly to a rotor for an electric generator of the flywheel type in which a plurality of permanent magnets and associated pole pieces are imbedded in the inner peripheral portions of the rim of the flywheel.

The manufacture of such rotors requires that the individual magnets and pole pieces first be assembled to form an annulus having a large central opening. Subsequently the annulus is inserted in a casting die having a die cavity conforming to the required shape of the rotor and nonmagnetic metal is cast around the major portion of the annulus to form the rotor flywheel.

Heretofore, the annulus comprising magnets and pole pieces has ordinarily been formed by inserting the magnets and pole pieces axially between two rings of nonmagnetic material such as brass, accurately positioning the magnets and pole pieces with respect to the rings and then securing the various parts by riveting the pole pieces to the rings and by swaging the rings over the magnets. This method of manufacture is disadvantageous in that the use of brass rings in the annulus and the labor of securing the pole pieces and magnets to the rings are costly.

Accordingly, the general object of this invention is to provide an annulus of magnets and pole pieces for use in the manufacture of a rotor for an electric generator and which annulus is readily and easily formed into a self-sustaining unit prior to its placement in the die cavity without the expenditure of much time or labor in accurately positioning or securing the parts relative to each other.

Further objects of the invention are to provide various details of construction and arrangement whereby the foregoing more general object is attained.

The drawings show a flywheel rotor constructed in accordance with the teachings of the invention and will be described but it will be understood that various changes may be made from the construction disclosed, and that the drawings and description are not to be construed as defining or limiting the scope of the invention, the claims forming a part of this specification being relied upon for that purpose.

Of the drawings:

FIG. 5 is a plan view of a plurality of magnets as originally cast.

FIG. 6 is a side view of FIG. 5.

FIG. 7 is an end view of FIG. 6.

FIG. 8 is a side view of another "pole piece" included in the annulus of FIG. 1.

FIG. 9 is an end view of the "pole piece" shown in FIG. 8.

FIG. 10 is a plan view of a dummy "magnet" included in the annulus of FIG. 1.

FIG. 11 is a side view of FIG. 10.

FIG. 12 is an end view of FIG. 10.

FIG. 13 is a plan view of a circular band included in the annulus of FIG. 1.

FIG. 14 is a side view of FIG. 13.

FIG. 15 is a side view of a shim used in the annulus of FIG. 1.

FIG. 16 is an end view of FIG. 15.

The first step in the manufacture of a rotor for an electric generator is to form an annulus having a large central opening and comprising an annular series of magnetic members which series includes an annular arrangement of permanent magnets and also includes an annular arrangement of pole pieces respectively engaging the magnets and having their inner faces at least approximately, but not necessarily exactly, tangent to a central cylindrical surface having a diameter approximately the same as that of said large central opening. The annulus also includes a circular band surrounding said magnetic members and the annulus further includes means acting upon some of the elements thereof to apply continuing radial pressure between said band and said engaged magnetic members so as to hold all of the elements of the annulus in substantially fixed relationship with each other. After the annulus has been formed, it is inserted in a casting die and a nonmagnetic material is cast about its major portion so as to form the body of a rotor structure.

Figure 1:
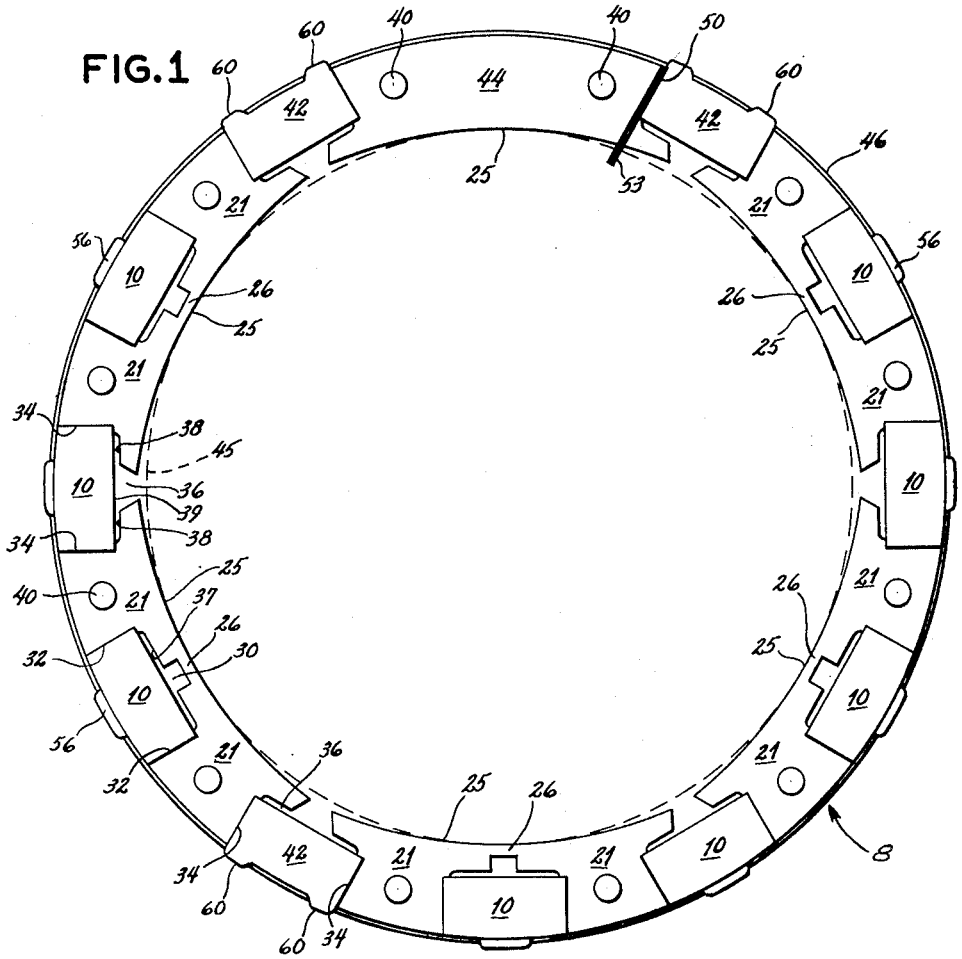
FIG. 1 is a plan view of an annulus of permanent magnets and pole pieces constructed in accordance with the invention.

FIG. 1 shows one example of an annulus 8 of permanent magnets and pole pieces constructed in accordance with the method taught by the present invention. The annulus comprises tangentially charged magnets 10, 10 with pole pieces 21 associated therewith interposed between them. As shown, the several magnets and pole pieces of the annulus are alternately positioned with respect to each other, but the invention in its broader aspects is not limited to the particular arrangement shown.

Figure 2:
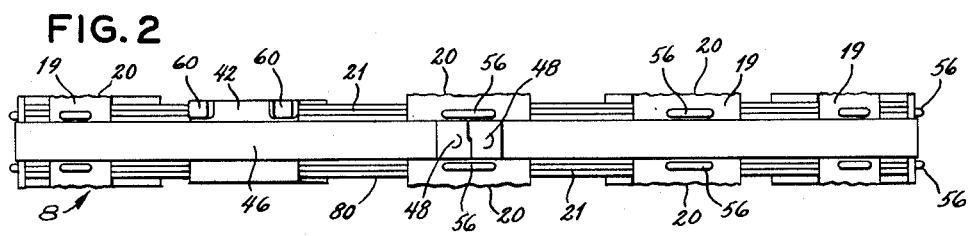
FIG. 2 is a side view of FIG. 1.
Figure 3:
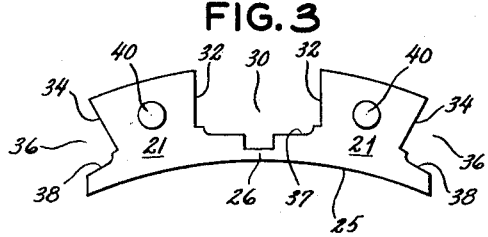
FIG. 3 is a side view of one of the pole pieces included in the annulus of FIG. 1.
Figure 4:
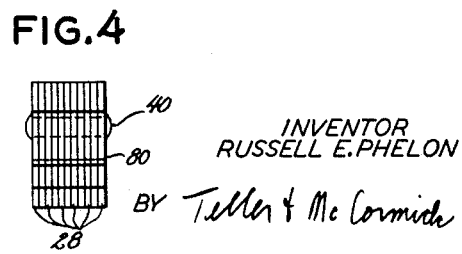
FIG. 4 is an end view of FIG. 3.
Figure 17:
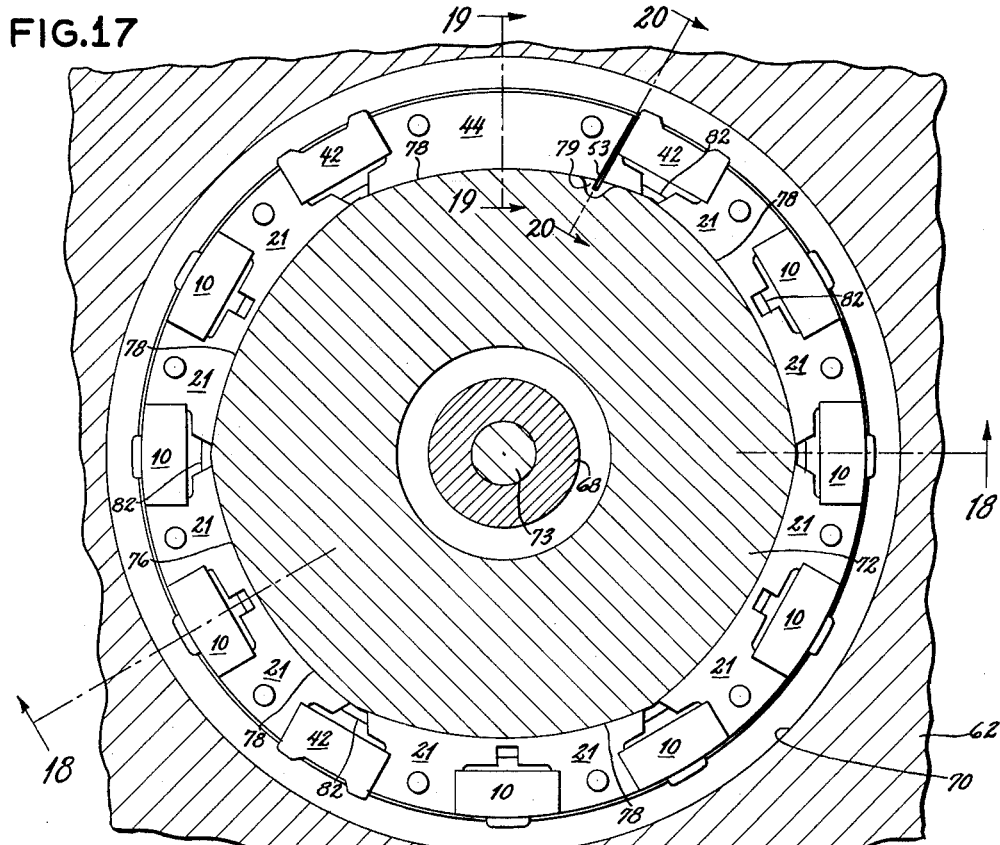
FIG. 17 is a partial sectional view taken along the line 17—17 in FIG. 18 looking in the direction of the arrows and showing the annulus of FIG. 1 positioned in the die cavity of a casting die.
Figure 18:
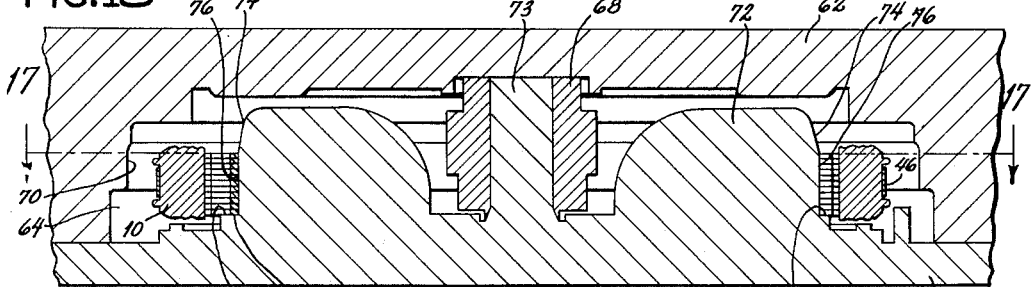
FIG. 18 is a transverse sectional view through FIG. 17 taken along the line 18—18 looking in the direction of the arrows.
Figure 19:
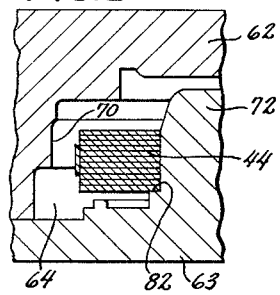
FIG. 19 is a sectional view through FIG. 17 along the line 19—19 looking in the direction of the arrows.
Figure 20:
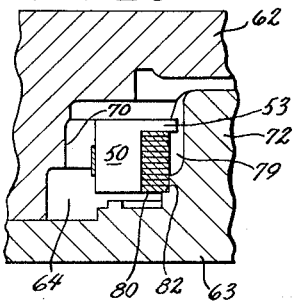
FIG. 20 is a sectional view taken through FIG. 17 along the line 20—20 looking in the direction of the arrows.
Figure 21:
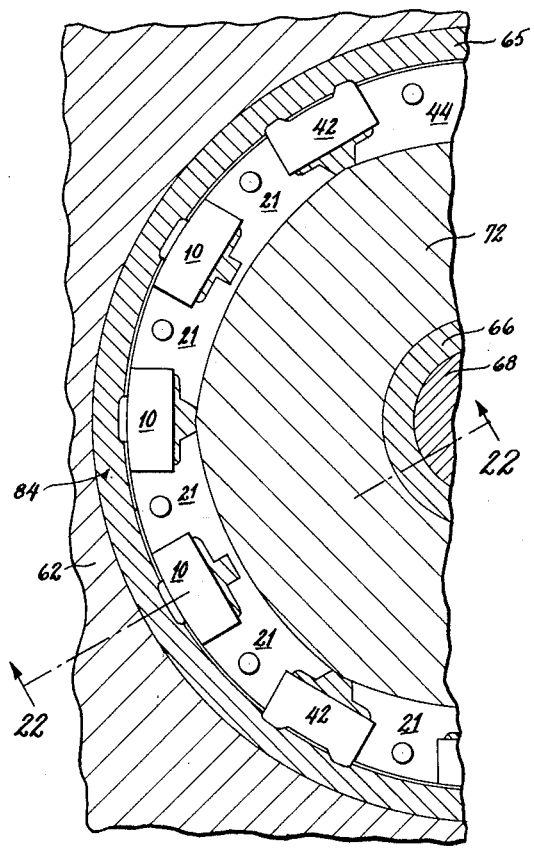
FIG. 21 is a partial sectional view taken along the same section plane as FIG. 17 showing the annulus of FIG. 1 with nonmagnetic metal cast around its major portion.
Figure 23:
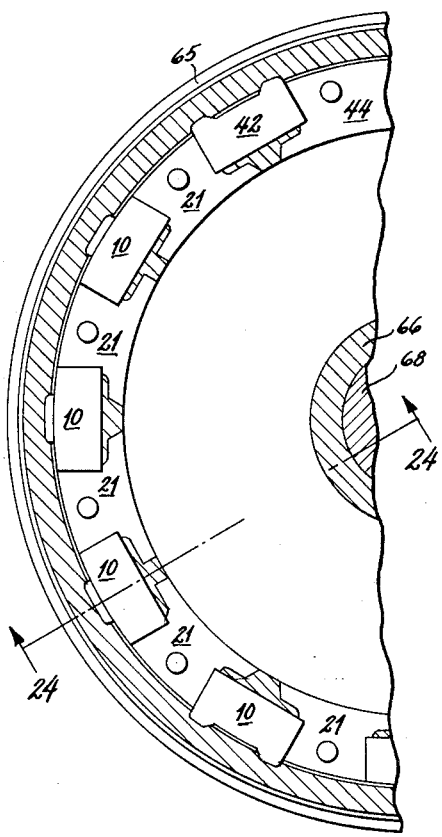
FIG. 23 is a partial sectional view taken through the rotor at the same plane as FIGS. 17 and 21 after the rotor has been removed from the die and after machining of the inner faces of the flywheel rim.
Figure 22:
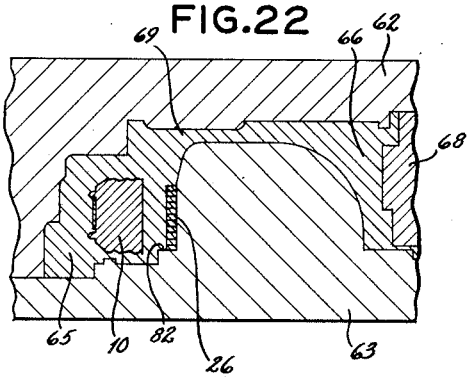
FIG. 22 is a sectional view taken through FIG. 21 along the line 22—22 looking in the direction of the arrows.

The permanent magnets 10, 10 which are utilized in the annulus 8 may first be cast in a continuous strip 14 as shown in FIGS. 5–7, although this is not necessary, and individually formed magnets may be used instead. Preferably, the strip 14 of magnets is cast with a series of grooves 16, 16 formed in the top and opposite side surfaces 18, 18 and 19, 19 respectively, of the strip 14. The grooves 16, 16 define planes through the magnet strip 14 which are weaker than any other portion of the strip and the individual magnets 10, 10 are obtained by breaking the magnet strip 14 along the planes formed by the grooves 16, 16. Prior to the breaking of the strip 14, the opposite side surfaces 18, 18 of the strip 14 are ground smooth. However, the surfaces 20, 20 (FIG. 2) formed by the breaking of the strip 14 are not ground but are left in their natural rough condition.

When the magnets 10, 10 are charged tangentially, the pole pieces 21, 21 may advantageously be formed generally arcuate in shape with curved inner faces 25, 25. Each pole piece 21, 21 is a lamination of a plurality of thin metal plates 28, 28.

Preferably and as shown, the pole pieces 21, 21 are formed in pairs with the members of each pair joined together at their inner faces by a connection 26. The combined two-part pole pieces are sometimes hereinafter referred to as duplex pole pieces. When there are pairs of pole pieces, each pair has an intermediate recess 30, the inner side edges 32, 32 of which are shaped to correspond to the smooth opposite side surfaces 18, 18 of the magnets 10, 10. In a similar manner, the end portions 34, 34 of the plates 28, 28 are shaped to define one-half of a recess 36 similar to that of the intermediate recess 30 so that opposite end portions 34, 34 of adjacent pairs of pole pieces 21, 21 will serve to define end recesses 36, 36 between adjacent pairs of pole pieces 21, 21 which recesses 36, 36 have configurations also corresponding generally with the smooth opposite side surfaces 18, 18 of the magnets 10, 10. The inner surfaces 37, 37 of the recesses 30, 30 and the inner surfaces 38, 38 of the recesses 36, 36 are cut away to provide a clearance space between the bottom surfaces 39, 39 of the magnets 10, 10 and the pole pieces 21, 21 so that these cast surfaces 39, 39 will not prevent proper location of the magnets 10, 10 in the recesses. The thin plates 28, 28 making up each pair of pole pieces 21, 21 are secured together by rivets 40 driven through each pole piece 21.

In the particular annulus construction shown in the drawings, the pole pieces 21, 21 and permanent magnets 10, 10 are augmented by dummy "magnets" 42, 42 and an inactive "pole piece" 44. The dummy "magnets" 42, 42 are formed from nonmagnetic material and have the same size as the magnets 10, 10 and a similar shape. The inactive "pole piece" 44 is the same size and shape as the pairs of pole pieces 21, 21 except that the intermediate recess 32 dividing each pair into separate pole pieces 21, 21 is not provided and the "pole piece" is solid throughout its central portion.

As shown in the drawings, three such dummy "magnets" 42, 42 and one inactive "pole piece" 44 are utilized. One dummy "magnet" 42 is inserted at each side of the inactive "pole piece" 44 to magnetically isolate the "pole piece" 44 from the pole pieces 21, 21 and the third dummy "magnet" 42 is inserted between the fifth and sixth magnets 10, 10 counting clockwise in FIG. 1. It is to be understood however that the incorporation of the dummy "magnets" 42, 42 and the inactive "pole pieces" 44 is not essential to the invention and that such dummy "magnets" 42, 42 and inactive "pole piece" 44 could be omitted entirely (as in the case of a twelve pole generator) or their number varied as desired without departing from the teachings of the present invention. Accordingly, the terms "magnets" and "pole pieces" used hereinafter and in the claims are intended to include either a true magnet or pole piece such as the magnets 10, 10 or the pole pieces 21, 21 or a simulated magnet or pole piece such as the dummy "magnets" 42, 42 or the inactive "pole piece" 44.

The magnets 10, 10 and 42, 42 and the pole pieces 21, 21 and 44 are thus arranged in an annular series and the several pole pieces and magnets are alternately positioned with respect to each other. As already stated, the pole pieces 21, 21 and 44 are arranged so that their curved inner faces 25, 25 are at least approximately, but not necessarily exactly, tangent to a central cylindrical surface indicated by the dotted lines 45 in FIG. 1.

During initial assembly the before-mentioned circular band 46 serves for limiting radial outward movement of the magnets and pole pieces. As hereinafter explained the band 46 also serves for the application of radial pressure to hold all members of the annulus 8 in substantially fixed relationship with each other. The band 46 is preferably made very thin in cross section so that it may be made of steel rather than a more expensive nonmagnetic material without materially short-circuiting the magnets 10, 10. However, nonmagnetic material may be used if desired. The ends of the band 46 may be secured together by any suitable fastening means such as spot welding or the like, and as shown in the drawings the ends of the band are notched and are spot welded at 48, 48.

As shown, additional means are provided as part of the annulus 8 for constantly urging the certain adjacent magnetic members away from each other tangentially with a resulting tendency to enlarge the diameter of the annular series of magnetic members and thereby press some of said members radially outward against said band 46 so as to effect interlocking engagement between all elements of the annulus. This means comprises one or more spacing members each inserted between two of the said magnetic elements. As shown, said spacing members are shims 50 which are inserted between a magnet and an adjacent pole piece so as to apply substantially tangential oppositely directed forces to the magnet and pole piece constantly acting to force the magnet and pole piece apart and to press the plurality of magnets 10, 10, 42, 42 and the pole pieces 21, 21 and 44 circumaxially together. The shims 50 are generally L-shape in form with a rectangular body 52 and a narrow leg 53 that serves to limit the extent to which the shims 50 can be inserted between the members of the annulus 8. The effect of these forces is to urge the magnets and pole pieces in a direction tending to enlarge the annulus and to tightly press the magnets 10, 10 and 42, 42, the pole pieces 21, 21 and 44 and the band 46 together under radial pressure into interlocking engagement. The shims 50 are shown inserted between one magnet 42 and the pole piece 44 but the shims could be inserted at other points in the annulus 8 just as well.

In order to prevent the annulus 8 from coming apart due to axial dislodgement of one or more of its members, some of the magnetic members are provided with means for preventing movement axially of the circular band 46. While it is not critical which members are so provided with these means it is preferred to provide these means on the magnets 10, 10 inasmuch as these magnets are the thickest members of the annulus and are most apt to become axially dislodged during handling. Accordingly, each of the magnets 10, 10 is provided with a pair of axially spaced radially extending projections 56, 56 in its top surface 19. The axial spacing between these projections 56, 56 is slightly greater than the axial width of the band 46 and in assembling the annular series of magnets and pole pieces the magnets 10, 10 are moved outwardly so that the band 46 lies between the projections. The magnets 42, 42 are also provided with projections 60, 60 on their top surfaces. However, unlike the projections 56, 56 on the magnets 10, 10 the projections 60, 60 on the magnets 42, 42 are positioned at the corners of the magnets 42, 42 and are located on the same side of the magnets.

Figure 24:
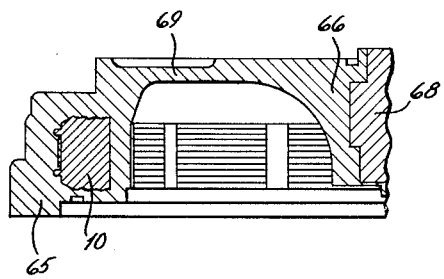
FIG. 24 is a sectional view through FIG. 23 along the line 24—24 looking in the direction of the arrows.

With the spacing members or shims 50, 50 in place all of the members of the annulus 8 are tightly interlocked together so as to be substantially fixed with respect to each other. The annulus is then ready for the casting operation and there is provided a suitable casting die having relatively movable opposed die members 62, 63 defining one or more die cavities 64 conforming to the required shape of the rotor. As seen from FIG. 24, the rotor comprises a flywheel structure having an outer rim portion 65 in which the annulus 8 is to be imbedded, a central hub portion 66 surrounding a shaft bearing 68 and a connecting web portion 69 between the rim 65 and the hub 66. Accordingly, one of the opposing die members 62 is provided with a generally circular recess 70 having its interior surfaces shaped to correspond to the desired configuration of the outer surfaces of the rotor flywheel while the other of said die members 63 is provided with an annular projection 72 and a central core 73. The annular projection 72 is provided with a tapered outer terminal surface 74 and an outer peripheral surface 76.

To insure proper dynamic balance of the rotor flywheel, it is important that the annulus 8 be truly concentric with the rotor. Accordingly, the annulus must be concentrically positioned in the die with respect to the die cavity 64. If the annulus is exactly circular, it will be concentric with the die cavity 64 when the central axis of the annulus coincides with the central axis of the die cavity 64. When the annulus is concentric with the die cavity, the inner faces 25, 25 of the pole pieces 21, 21 and 44 will be exactly tangent to a cylindrical surface having a central axis coinciding with the central axis of the die cavity. Such a cylindrical surface is represented in FIG. 1 by the dotted line 45.

As before stated, the annulus was formed with the inner faces 25, 25 of the pole pieces 21, 21 and 44 approximately, but not necessarily exactly, tangent to the cylindrical surface 45. Due to minor manufacturing variations in the magnets 10, 10 and in the pole pieces 21, 21, the annulus 8 may be, and probably is, slightly elliptical or otherwise out of round. Accordingly, the annulus must be corrected for any deviation from a true circular shape and the surfaces 25, 25 must be brought into exact tangency with said cylindrical surface prior to the casting step. This is accomplished during the placement of the annulus over the outer peripheral surface 76 of the annular projection 72 on the die member 63. The outer peripheral surface 76 of this projection is formed so as to be at least substantially cylindrical and with a central axis coincident with the central axis of the die cavity 64. While the outer peripheral surface 76 of the projection 72 may be made truly cylindrical, it is preferred that this outer surface be made substantially, but not exactly, cylindrical.

As shown, the outer peripheral surface 76 of the projection 72 is formed by a plurality of equal curved segmental surfaces 78, 78 each having the same curvature and a slightly greater length than the curved inner faces 25, 25 of the pole pieces 21, 21 and 44. The central axis of the continuous surface 76 formed by these segmental surfaces 78, 78 coincides with the central axis of the die cavity 64. In addition, the smallest diameter of this continuous surface 76 is equal to the shortest distance between oppositely disposed pole pieces 21, 21 in the annulus 8 when the inner faces 25, 25 are exactly tangent to the cylindrical surface indicated by the dotted line 45 in FIG. 1. To state it otherwise, the inscribed circle of the outer peripheral surface 76 of the annular projection 72 will have the same diameter as the dotted line 45 in FIG. 1.

When the annulus 8 is placed over the projection 72, the inner faces of the connections 26, 26 of the pole pieces 25, 25 first contact the tapered outer terminal surface 74 of the projection 72 and then slip over the substantially cylindrical surface 76. In placing the annulus 8 with respect to the projection 72 the annulus is disposed so that the legs 53 of the shims 50 are aligned with a groove 79 formed in the projection 72 for the purpose of accommodating the legs. The placing of the annulus over the substantially cylindrical outer peripheral surface 76 of the annular projection 72 corrects any deviation from exact tangency in the annulus 8 as initially formed and accurately positions all portions of the annulus concentrically with respect to the die cavity 64 and thus with the rotor as formed. The annulus 8 is supported in the die cavity 64 by the engagement of the inner portion of the side surfaces 80, 80 of the pole pieces 21, 21 and 44 with a peripheral shoulder 82 formed at the base of the annular projection 72.

The formation of the rotor is completed by inserting the shaft bearing 68 on the core 73 and then by closing the die members 62, 63 and casting nonmagnetic metal 84 such as aluminum around the major portion of the annulus 8. After the casting is removed from the die cavity and has cooled sufficiently, the inner surfaces 25, 25 of the pole pieces 21, 21 and 44 are machined so as to make them truly cylindrical. In the machining process, the connections 26, 26 are machined away and the pole pieces 21, 21 of each pair of pole pieces are thereby separated.

The invention claimed is:

1. An annulus for the rotor of an electric generator, which annulus has a large central opening and comprises in combination: an annular series of magnetic members which series includes an annular arrangement of permanent magnets and also includes an annular arrangement of pole pieces respectively engaging the magnets and located with their inner faces at least approximately tangent to a central cylindrical surface having the diameter of said large central opening, a circular band surrounding said magnetic members and having substantially uniformly spaced engagement with some of them, and means for applying continual pressure tending to move some of the magnetic members away from each other in a tangential direction with a resultant tendency to enlarge the diameter of the series of magnetic members and thereby press some of said members tightly against the surrounding band so as to hold all elements of the annulus in substantially fixed relationship with each other.

2. An annulus for the rotor of an electric generator, which annulus has a large central opening and comprises in combination: an annular series of magnetic members which series includes an annular arrangement of permanent magnets and also includes an annular arrangement of pole pieces respectively engaging the magnets and located with their inner faces at least approximately tangent to a central cylindrical surface having the diameter of said large central opening, a circular band surrounding said magnetic members and having substantially uniformly spaced engagement with some of them, and a spacing member between two of the magnetic members tending to force said two members away from each other in a tangential direction with a resultant tendency to enlarge the diameter of the series of magnetic members and thereby press some of said members tightly against the surrounding band so as to hold all elements of the annulus in substantially fixed relationship with each other.

3. An annulus for the rotor of an electric generator, which annulus has a large central opening and comprises in combination: an annular series of magnetic members which series comprises pole pieces and magnets alternately positioned with respect to each other and with the pole pieces arranged with their inner faces at least approximately tangent to a central cylindrical surface having the diameter of said large central opening, a circular band surrounding said magnetic members and having substantially uniformly spaced engagement with some of them, and a spacing member positioned between a pole piece and a magnet and serving to press said plurality of pole pieces and magnets circumaxially together and to press some of them tightly against the circular band so as to hold all members of the annulus in substantially fixed relationship with each other.

4. An annulus for the rotor of an electric generator, which annulus has a large central opening and comprises in combination: an annular series of permanent magnets positioned around said central opening, a plurality of duplex pole pieces each having two parts respectively fitting between two magnets and each also having an integral inner connection between said parts, a circular band surrounding said magnets and pole pieces and having substantially uniformly spaced engagement with some of them, and means for applying continual pressure tending to move some of the magnetic members away from each other in a tangential direction with a resultant tendency to enlarge the diameter of the series of magnetic members and thereby press some of said members tightly against the surrounding band so as to hold all elements of the annulus in substantially fixed relationship with each other.

(References on following page)

References Cited in the file of this patent

UNITED STATES PATENTS

| | | |
|---|---|---|
| 1,535,330 | Mills | Apr. 28, 1925 |
| 2,364,572 | Upham | Dec. 5, 1944 |
| 2,421,115 | Carlson | May 27, 1947 |
| 2,710,929 | Phelon | June 14, 1955 |
| 2,756,356 | Brownlee et al. | July 24, 1956 |
| 2,963,599 | Gayler | Dec. 6, 1960 |
| 2,976,439 | Kiekhaefer | Mar. 21, 1961 |

FOREIGN PATENTS

| | | |
|---|---|---|
| 517,614 | Great Britain | Feb. 5, 1940 |